(12) United States Patent
Sugimoto

(10) Patent No.: US 8,158,705 B2
(45) Date of Patent: Apr. 17, 2012

(54) POLYMER COMPOSITION AND PNEUMATIC TIRE

(75) Inventor: Mutsuki Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/829,626

(22) Filed: Jul. 2, 2010

(65) Prior Publication Data

US 2011/0060082 A1 Mar. 10, 2011

(30) Foreign Application Priority Data

Sep. 8, 2009 (JP) ................................ 2009-207008

(51) Int. Cl.
*C08K 3/34* (2006.01)
*C08K 5/24* (2006.01)
(52) U.S. Cl. ........................ 524/445; 524/262
(58) Field of Classification Search .................... 524/445
See application file for complete search history.

(56) References Cited

U.S. PATENT DOCUMENTS

| 4,345,052 | A | 8/1982 | Mumcu et al. |
| 4,356,300 | A | 10/1982 | Isler et al. |
| 4,910,321 | A | 3/1990 | Kennedy et al. |
| 4,946,899 | A | 8/1990 | Kennedy et al. |
| 5,219,948 | A | 6/1993 | Storey et al. |
| 5,239,004 | A * | 8/1993 | Pyke et al. ................. 525/184 |
| 2004/0031550 | A1 | 2/2004 | Kanenari et al. |
| 2009/0218024 | A1 | 9/2009 | Tsou et al. |
| 2011/0011511 | A1 | 1/2011 | Miyazaki et al. |

FOREIGN PATENT DOCUMENTS

| EP | 0 206 756 A2 | 12/1986 |
| JP | 55-133424 A | 10/1980 |
| JP | 56-65026 A | 6/1981 |
| JP | 62-48704 A | 3/1987 |
| JP | 63-95251 A | 4/1988 |
| JP | 64-62308 A | 3/1989 |
| JP | 3-174403 A | 7/1991 |
| JP | 6-107896 A | 4/1994 |
| JP | 9-165469 A | 6/1997 |
| JP | 10-508888 A | 9/1998 |
| JP | 2000-160024 A | 6/2000 |
| JP | 2003-327751 A | 11/2003 |
| JP | 2005-113013 A | 4/2005 |
| JP | 2005113013 A * | 4/2005 |
| JP | 2005-344030 A | 12/2005 |
| JP | 2005344030 A * | 12/2005 |
| JP | 2007-291256 A | 11/2007 |
| JP | 2007291256 A * | 11/2007 |
| JP | 2009-149711 A | 7/2009 |
| JP | 2009-528925 A | 8/2009 |
| JP | 2010-13617 A | 1/2010 |
| WO | WO 96/15156 A2 | 5/1996 |
| WO | WO 03/029029 A1 | 4/2003 |

OTHER PUBLICATIONS

Office Action dated Aug. 9, 2011 for corresponding Japanese Application No. 2009-207008.

* cited by examiner

*Primary Examiner* — Ling Choi
*Assistant Examiner* — Hui Chin
(74) *Attorney, Agent, or Firm* — Birch, Stewart, Kolasch & Birch, LLP

(57) ABSTRACT

An object of the present invention is to provide a polymer composition that can decrease the thickness of an inner liner while maintaining air permeation resistance. The polymer composition of the present invention includes 0.1 to 50 parts by mass of an organic derivative of a clay mineral based on 100 parts by mass of a polymer mixture containing 99 to 60% by mass of a styrene-isobutylene-styrene triblock copolymer and 1 to 40% by mass of a polyamide-based polymer that contains polyamide in the molecular chain and has a Shore D hardness of 70 or less.

4 Claims, 1 Drawing Sheet

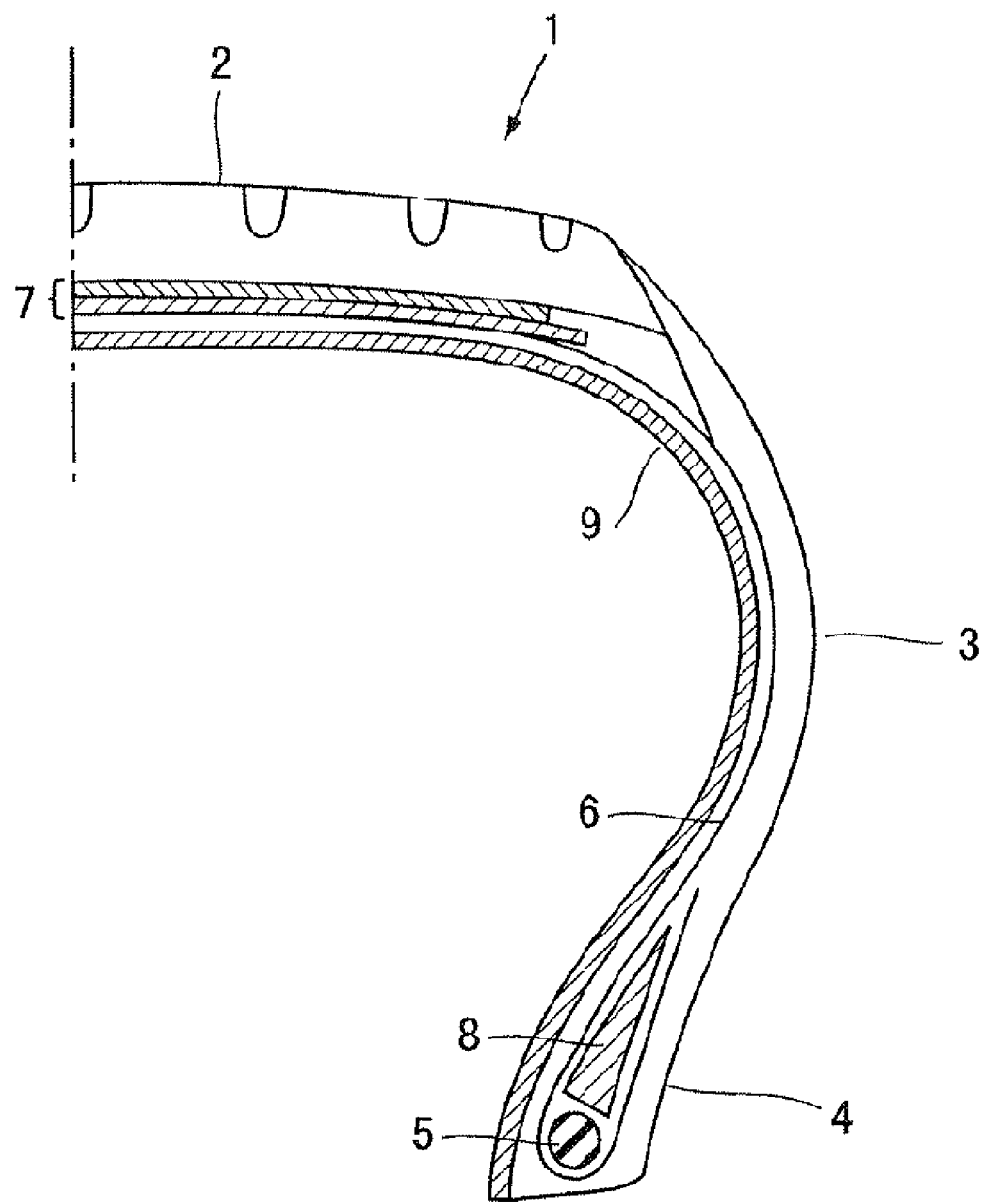

POLYMER COMPOSITION AND PNEUMATIC TIRE

This nonprovisional application is based on Japanese Patent Application No. 2009-207008 filed on Sep. 8, 2009 with the Japan Patent Office, the entire contents of which are hereby incorporated by reference.

BACKGROUND OF THE INVENTION

1. Field of the Invention

The present invention relates to a polymer composition which is excellent in air permeation resistance, and a tire having an inner liner using the same.

2. Description of the Background Art

Recently, an attempt has been made to perform weight saving of tires because of strong social demands for fuel economy of automobiles. An attempt has also been made to perform weight saving of inner liners, among tire members, that are disposed inside tires and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl rubber-containing rubber composition containing 70 to 100% by mass of a butyl rubber and 30 to 0% by mass of a natural rubber. The butyl-based rubber formulation contains, in addition to butylene, about 1% by mass of isoprene, that enables crosslinking between rubber molecules along with sulfur, a vulcanization accelerator and zinc white. In the case of a conventional formulation, the butyl-based rubber requires the thickness of about 0.6 to 1.0 mm for tires for passenger cars, or the thickness of about 1.0 to 2.0 mm for trucks and buses. In order to perform weight saving of tires, there is proposed a polymer that is excellent in air permeation resistance as compared with the butyl-based rubber, and can further decrease the thickness of an inner liner layer.

Japanese Patent Laying-Open No. 2007-291256 proposes, as a pneumatic tire that can simultaneously realize suppression of air pressure drop, improvement in durability and improvement in fuel efficiency, a pneumatic tire using a rubber composition for an inner liner, containing at least an ethylene-vinyl alcohol copolymer represented by the following general formula (I):

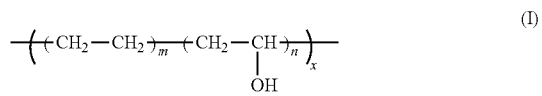

(I)

wherein m and n are each independently from 1 to 100 and x is from 1 to 100, in the amount within a range from 15 to 30 parts by mass based on 100 parts by mass of a rubber component composed of a natural rubber and/or a synthetic rubber in an inner liner layer. However, the technique of Japanese Patent Laying-Open No. 2007-291256 leaves room for improvement in respect of weight saving of tires since a rubber sheet using the rubber composition has a thickness of 1 mm.

Japanese Patent Laying-Open No. 09-165469 proposes a pneumatic tire in which adhesion between an inner liner and a rubber composition constituting the inner surface of the tire or a carcass layer can be improved by forming an inner liner layer using nylon with low air permeability. However, the technique of Japanese Patent Laying-Open No. 09-165469 has a problem that a rubber cement composed of a rubber composition must be bonded after subjecting a nylon film to an RFL treatment so as to form a nylon film layer, resulting in complicated steps.

SUMMARY OF THE INVENTION

An object of the present invention is to provide a polymer composition that can decrease the thickness of an inner liner while maintaining air permeation resistance.

The present invention provides a polymer composition including 0.1 to 50 parts by mass of an organic derivative of a clay mineral, based on 100 parts by mass of a polymer mixture containing 99 to 60% by mass of a styrene-isobutylene-styrene triblock copolymer and 1 to 40% by mass of a polyamide-based polymer that contains polyamide in the molecular chain and has a Shore D hardness of 70 or less.

In the polymer composition according to the present invention, the polymer mixture preferably contains 15 to 30% by mass of an ethylene-vinyl alcohol copolymer.

In the polymer composition according to the present invention, the styrene-isobutylene-styrene triblock copolymer preferably contains 10 to 30% by mass of a styrene unit.

In the polymer composition according to the present invention, the polyamide-based polymer is preferably a block copolymer composed of a polyamide component and a polyether component.

The present invention provides a pneumatic tire including an inner liner made of a polymer composition.

According to the present invention, it is possible to provide a polymer composition that can decrease the thickness of an inner liner while maintaining air permeation resistance.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic sectional view showing the right half of a pneumatic tire in one embodiment of the present invention.

DESCRIPTION OF THE PREFERRED EMBODIMENTS

In one embodiment of the present invention, the polymer composition contains 0.1 to 50 parts by mass of a layered clay mineral prepared by intercalating an organic compound based on 100 parts by mass of a polymer mixture containing 99 to 60% by mass of a styrene-isobutylene-styrene triblock copolymer (hereinafter may also be referred to as an SIBS) and 1 to 40% by mass of a polyamide-based polymer that contains polyamide in the molecular chain and has a Shore D hardness of 70 or less.

Because of the isobutylene moiety of an SIBS, the polymer composition has excellent air permeation resistance and durability. An SIBS has excellent durability since a molecular structure other than those of aromatic molecules is completely saturated and therefore deterioration and hardening are suppressed. Because of contribution of the polyamide moiety of the polyamide-based polymer, it becomes possible for the polymer composition to bond with an unsaturated polymer and thus adhesion with an adjacent rubber is improved.

Furthermore, in one embodiment of the present invention, a pneumatic tire uses the polymer composition for an inner liner. The polymer composition does not use a halogenated rubber having high specific gravity, which has hitherto been used so as to impart air permeation resistance, such as a halogenated butyl rubber is not used in order to ensure air permeation resistance by the addition of the SIBS. Also when the halogenated rubber is used, it is possible to decrease the amount of use. Therefore, weight saving of the tire can be performed and the effect of improving fuel efficiency can be obtained.

<Styrene-Isobutylene-Styrene Triblock Copolymer>

In the polymer composition in one embodiment of the present invention, the content of the SIBS in the polymer mixture is adjusted within a range from 99 to 60% by mass. When the content of the SIBS is 60% by mass or more, excellent air permeation resistance and durability can be obtained. The content is preferably adjusted within a range from 95 to 80% by mass since the air permeation resistance and durability become more satisfactorily.

The SIBS usually contains 10 to 40% by mass of a styrene unit. The content of the styrene unit is preferably adjusted within a range from 10 to 30% by mass since the air permeation resistance and durability become more satisfactorily.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, or preferably from about 10,000 to 30,000 for a styrene block, in view of the rubber elasticity and handling (when the polymerization degree is less than 10,000, a liquid is obtained).

An SIBS can be obtained by a conventional polymerization method of a vinyl-based compound and, for example, it can be obtained by a living cationic polymerization method.

For example, Japanese Patent Laying-Open No. 62-048704 and Japanese Patent Laying-Open No. 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. No. 4,946,899, U.S. Pat. No. 5,219,948 and Japanese Patent Laying-Open No. 03-174403.

The SIBS does not have a double bond other than an aromatic double bond in the molecule and has high stability to ultraviolet rays as compared with a polymer having a double bond in the molecule, for example, polybutadiene, and therefore has satisfactory weatherability. Furthermore, although it does not have a double bond in the molecule and is a saturated rubbery polymer, a refractive index (nD) at 20° C. of light having a wavelength of 589 nm is 1.506, as described in Polymer Handbook, Willy, 1989. This is significantly higher than that of other saturated rubbery polymers, for example, an ethylene-butene copolymer.

<Polyamide-Based Polymer>

In the polymer composition in one embodiment of the present invention, the content of the polyamide-based polymer in the polymer mixture is adjusted within a range from 1 to 40% by mass. When the content of the polyamide-based polymer is 40% by mass or less, a polymer mixture that has both durability and adhesion can be obtained. Since it is possible to ensure durability and adhesion and to add a larger amount of an SIBS and an ethylene-vinyl alcohol copolymer which are excellent in air permeation resistance, the content is preferably adjusted within a range from 3 to 20% by mass.

The polyamide-based polymer is preferably a polyamide-based polymer in which the Shore D hardness is at most 70. A Shore D hardness exceeding 70 is not preferred since it makes cracking properties upon tire flexing and transfer poor. The Shore D hardness is preferably within a range from 15 to 70, more preferably from 18 to 70, still more preferably from 20 to 70, and particularly preferably from 25 to 70.

The polyamide-based polymer preferably contains 50% by mass or more of the following polyetheramide elastomer (X):

Polyetheramide elastomer (X) that is a block copolymer composed of a polyamide component and a polyether component, obtained by polymerizing a triblock polyether diamine compound (A) represented by the following formula (II), a polyamide-forming monomer (B) and a dicarboxylic acid compound (C):

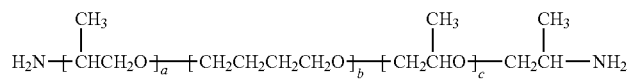

(II)

wherein a and b represent 1 to 20, and c represents 4 to 50.

The polyamide-forming monomer (B) is preferably at least one of compounds represented by the following formulas (III) and (IV):

$$H_2N-R^1-COOH \quad (III)$$

wherein $R^1$ represents a linking group containing a hydrocarbon chain; and

(IV)

wherein $R^2$ represents a linking group containing a hydrocarbon chain.

The dicarboxylic acid compound (C) is preferably at least one kind of a compound selected from the group consisting of a compound represented by the following formula (V), an aliphatic dicarboxylic acid compound and an alicyclic dicarboxylic acid compound:

(V)

wherein $R^3$ represents a linking group containing a hydrocarbon chain, and y represents 0 or 1.

When the polyamide-based polymer is a polyamide-based polymer having a hard segment derived from a polyamide component and a soft segment derived from a polyether component, it shows low crystallinity. Therefore, it is possible to obtain a polyamide-based polymer that has a high elongation at break EB and shows flexibility within a temperature range from a low temperature to a high temperature.

The polyamide-based polymer can exhibit an excellent effect in the adhesion with an adjacent rubber since fluidity improves at the tire vulcanization temperature (140 to 180° C.) and also wettability with the uneven surface improves.

In one embodiment of the present invention, as the polyamide-based polymer, a known polyamide-based polymer can be used. As the polyamide-based polymer, for example, an elastomer constituted from a polyamide block composed of at least one kind of an aliphatic nylon selected from the group consisting of nylon 6, nylon 66, nylon 11 and nylon 12, and at least one kind of a polyether block selected from the group consisting of polyoxyethylene, polyoxypropylene and polyoxybutylene can be used.

The method for producing the polyamide-based polymer is not particularly limited and methods disclosed in Japanese Patent Laying-Open No. 56-065026, Japanese Patent Laying-Open No. 55-133424 and Japanese Patent Laying-Open No. 63-095251 can be employed.

<Polymer Mixture>

The polymer mixture used in one embodiment of the present invention can contain, in addition to the SIBS and the polyamide-based polymer that contains polyamide in the molecular chain and has a Shore D hardness of 70 or less, other polymers or resins. For example, the polymer mixture can be blended with, in addition to the SIBS and the polyamide-based polymer, nylon, PET, a chlorobutyl rubber, a natural rubber, an ethylene-propylene-diene terpolymer (EPDM), a styrene-butadiene rubber (SBR), a butadiene rubber, an isoprene rubber, a butyl rubber, a halogenated butyl rubber and an acrylonitrile-butadiene rubber (NBR).

The polymer mixture used in one embodiment of the present invention preferably contains 15 to 30% by mass of an ethylene-vinyl alcohol copolymer. When the content of the ethylene-vinyl alcohol copolymer in the polymer mixture is 15% by mass or more, it is possible to ensure gas barrier properties of the polymer composition. When the content is 30% by mass or less, it is possible to ensure the kneadability on the production of the polymer composition and to ensure basic performance such as mechanical strength in the inner liner layer of the tire. Furthermore, durability of the tire becomes satisfactory. The content is more preferably adjusted to 20% by mass or more, and still more preferably 25% by mass or more.

The ethylene-vinyl alcohol copolymer is preferably represented by the following general formula (I):

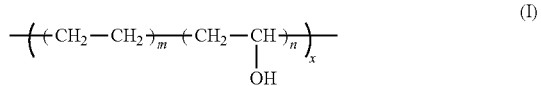
(I)

wherein m and n each independently represent 1 to 100, and X is from 1 to 1,000.

Compatibility with other components in the polymer mixture is satisfactorily imparted by the ethylene-derived moiety of the ethylene-vinyl alcohol copolymer, and the ethylene-vinyl alcohol copolymer can exist in a fine dispersion size in the polymer composition. The ethylene-vinyl alcohol copolymer has satisfactory gas barrier properties due to contribution of the vinyl alcohol-derived moiety. In the present invention, when the ethylene-vinyl alcohol copolymer having excellent gas barrier properties is dispersed in the form of islands in a fine size in the polymer composition, satisfactory gas barrier properties are exhibited even when a thin inner liner layer of a tire is formed. Thus, it is possible to perform weight saving of the tire, and the effect of improving fuel efficiency is obtained.

In the general formula (I), m and n are adjusted to 1 or more so as to constitute an ethylene-vinyl alcohol copolymer. When m and n are each 100 or less, it is possible to obtain an ethylene-vinyl alcohol copolymer that has both compatibility with other components in the polymer mixture and gas barrier properties. Since compatibility with other components in the polymer mixture becomes more satisfactory, m is more preferably adjusted to 5 or more. Since gas barrier properties become more satisfactory, n is more preferably adjusted to 5 or more. Since it is hard to fail to exhibit gas barrier properties due to the vinyl alcohol-derived moiety, m is preferably adjusted to 95 or less, and more preferably 80 or less. Since it is hard to fail to exhibit satisfactory compatibility with the polymer mixture due to the ethylene-derived moiety, n is preferably adjusted to 95 or less, and more preferably 80 or less.

In the general formula (I), x is adjusted to 1 or more so as to constitute the ethylene-vinyl alcohol copolymer. When x is 1,000 or less, kneadability in the production of the polymer composition is ensured and a polymer composition containing an ethylene-vinyl alcohol copolymer dispersed uniformly therein is obtained. Since satisfactory compatibility with other components in the polymer mixture and gas barrier properties are exhibited, x is more preferably adjusted to 10 or more. In view of satisfactory kneadability, x is still more preferably adjusted to 500 or less, and even more preferably 100 or less.

The ethylene-vinyl alcohol copolymer represented by the general formula (I) may be contained in the polymer composition in a state of being copolymerized with other components. In this case, the content of the ethylene-vinyl alcohol copolymer means the content of the structure moiety represented by the general formula (I).

The molecular structure of the ethylene-vinyl alcohol copolymer can be confirmed, for example, by an infrared absorption spectrum (IR) and a nuclear magnetic resonance spectrum (NMR).

<Polymer Composition>

The polymer composition according to one embodiment of the present invention contains, in addition to the SIBS and the polyamide-based polymer that contains polyamide in the molecular chain and has a Shore D hardness of 70 or less, an organic derivative of a clay mineral.

<Organic Derivative of a Clay Mineral>

The organic derivative of a clay mineral is a layered clay mineral obtained by intercalating an organic compound. By intercalating of the organic compound between layered clay minerals, interlayer expansion occurs and dispersibility in the polymer is improved.

The layered clay mineral is a kind of layered silicate minerals and has a crystal structure in which three layers of a silicic acid tetrahedron layer, an alumina octahedron layer and a silicic acid tetrahedron layer are laminated, and the unit layer is in the form of a very thin plate having a thickness of about 10 Å (1 nm) and a spread of 0.1 to 1 μm.

Typical examples of the layered clay mineral include montmorillonite. Montmorillonite becomes insufficient in positive charge since a portion of Al atoms as a central atom of an alumina octahedron layer in a crystal structure may be substituted with Mg atoms, and thus each crystal layer itself is negatively charged. Insufficient charge is alleviated by interposing cations such as $Na^+$, $K^+$, $Ca^{2+}$ and $Mg^{2+}$ between crystal layers, resulting in a stable state. Therefore, montmorillonite is present in a state where a number of crystal layers are laminated.

When water is brought into contact with a surface of a plate crystal layer of montmorillonite, water molecules are hydrated with interlaminar exchangeable cations and interlayer expansion occurs. By intercalating an organic compound between layers utilizing cation exchangeability of montmorillonite, interlayer expansion occurs and thus dispersibility in an organic solvent or a polymer is improved.

Examples of the layered clay mineral include phyllosilicates, for example, montmorillonite (particularly sodium montmorillonite, magnesium montmorillonite and calcium montmorillonite) and smectite-based clays such as bentonite, kaolinite, nonlite, beidellite, volchonskoite, hectorite, saponite, sauconite, sobockite, stevensite, svinfordite, and vermiculite; mica minerals such as illite and illite/smectite mixtures (mixtures of rectorite, tarosovite, ledikite and the clay compound, and illite), or attapulgite and a sepiolitehydrotalcite-based layered compound. Of these layered clay minerals, a smectite-based clay is preferred and a montmorillonite-based clay is particularly preferred. It is also possible to use bentonite containing a smectite-based clay mineral. These layered clay minerals are usually obtained by collecting a natural mineral and subjecting the mineral to a predetermined purification operation. These synthetic clays can be used without any distinction.

Examples of the organic compound that can be used as an intercalant include an organic compound having an ionizable polar group in the molecule. It is considered that the organic compound having a polar group causes a strong interaction with a surface of a layer coated with negative ions such as oxygen ions of a smectite-based clay mineral and intercalates between layers of the layered clay mineral, resulting in interlayer expansion.

The organic compound is preferably a compound which has an alkyl group having 6 or more carbon atoms, and has an ionizable polar group at the end. Examples thereof include those having a hydroxyl group or a carboxyl group, aldehydes, amines, amides and quaternary ammonium salts.

Examples of the organic compound having a hydroxyl group include aliphatic alcohols such as octyl alcohol and nonyl alcohol; alcohols substituted with an alkyl group, such as an aromatic alcohol; and phenols.

Examples of the organic compound having a carboxyl group include linear aliphatic acids such as stearic acid, palmitic acid and lauric acid; linear alkenoic acids such as oleic acid; dienoic acids such as linolelaidic acid; and polyunsaturated aliphatic acids such as trienonic acid.

Examples of aldehydes include hexylaldehyde.

Examples of amines or amides include polar organic compounds having one or more amines or amides, such as alkylamines, aminocycloalkanes and aminocycloalkane substituted compounds, cyclic aliphatic diamines, aliphatic amines, alkylaromatic amines, alkyldiarylamines and aliphatic amides, and also include primary, secondary and/or tertiary amines or amides. Of these, alkylamines, aliphatic amines, alkylaromatic amines and alkyldiarylamines are preferred. These organic compounds can be used alone, or two or more kinds thereof can be used in combination.

Examples of preferred amines include primary amines such as 1-hexylamine, 1-heptylamine, 1-octylamine, 1-nonylamine, 1-dodecylamine, 1-hexadecylamine, 1-octadecylamine and oleylamine; secondary amines such as di-n-dodecylamine, di-n-hexadecylamine and di-n-octadecylamine; tertiary amines such as dimethyl-n-octylamine, dimethyl-n-decylamine, dimethyl-n-tetradecylamine, dimethyl-n-hexadecylamine, dimethyl-n-octadecylamine and dimethyloleylamine; and aliphatic amines such as di-n-decylmethylamine di(coco alkyl)methylamine, tri-n-octylamine, tri-n-decylamine and tri-n-hexadecylamine.

Examples of preferred amides include hexylamide, heptylamide, octylamide, nonylamide, lauramide, myristamide, palmitamide, steramide, palmiamide, oleamide and linoleamide.

It is also possible to use, as the organic compound having a polar group, those having a nitrile group or a lactam group, pyridines, esters, surfactants and ethers.

Examples of the quaternary ammonium salt include a dimethyldistearylammonium salt, a trimethylstearylammonium salt, dimethyldioctadecylammonium, dimethylbenzyloctadecylammonium, and trimethyloctadecylammonium.

As the method of intercalating a layered clay mineral into an organic compound, a known method can be employed. For example, there is a method in which, in order to bring a montmorillonite-based clay mineral into contact with an organic compound, a layered clay mineral is impregnated with water in the amount of about 10 to 20% by mass based on the mass of the organic compound in advance, and then the organic compound is brought into contact with the montmorillonite-based clay mineral to obtain an organic derivative of a clay mineral.

The cation exchange amount of the organic compound in the organic derivative of a clay mineral is preferably from 50 to 200 meg/100 g.

The amount of the organic derivative of a clay mineral is preferably from 0.1 to 50 parts by mass, and more preferably from 0.5 to 30 parts by mass, based on 100 parts by mass of the polymer mixture. When the amount of the organic derivative of a clay mineral is less than 0.1 parts by mass, air permeability of the polymer composition, and tensile characteristics at high temperature deteriorate. In contrast, when the amount of the organic derivative of a clay mineral exceeds 50 parts by mass, the hardness of the polymer composition excessively increases and thus flexural fatigue properties deteriorate.

<Other Compounding Agents>

The polymer composition in one embodiment of the present invention can be blended with various compounding agents and additives with which a common rubber composition is blended, such as other reinforcing agents, vulcanization agents, vulcanization accelerators, various oils, antioxidants, softeners, plasticizers and coupling agents. The content of these compounding agents and additives can be adjusted to a common amount.

<Preparation of Polymer Composition>

The polymer composition in one embodiment of the present invention can be prepared by pelletizing a polymer mixture in accordance with a predetermined formulation using a twin screw extruder, followed by extrusion using a T die extruder or an inflation coextruder.

<Pneumatic Tire>

The present invention can be applied to various pneumatic tires for passenger cars, trucks and buses, and heavy duty equipment. FIG. 1 is a sectional view showing the right half of a pneumatic tire in one embodiment of the present invention. A pneumatic tire 1 includes a tread part 2, a side wall part 3 and a bead part 4. Furthermore, a bead core 5 is embedded in bead part 4. Also provided are a carcass 6 whose ends are respectively folded around bead core 5 and latched, that is provided from one bead part 4 to the other bead part, and a belt layer 7 composed of two plies outside a crown part of carcass 6. An inner liner 9 extending from one bead part 4 to the other bead part 4 is disposed inside of carcass 6. Belt layer 7 is disposed so that cords are mutually intersected between two plies composed of a steel cord or an aramid fiber cord at an angle of usually 5 to 30° in a tire circumferential direction. Regarding the carcass, organic fiber cords made of polyester, nylon or aramid are arranged at an angle of about 90° in a tire circumferential direction, and a bead apex 8 extending from the top of bead core 5 in a side wall direction is disposed in the region surrounded by the carcass and the folded part thereof.

The pneumatic tire is produced by a conventional method using the polymer composition of the present invention for an inner liner. The inner liner layer is obtained by extruding components of the polymer composition into a sheet (film) using a T die extruder (temperature conditions: 130° C. to 200° C.) and then laminated with other tire members on a tire molding machine to form an uncrosslinked tire. A pneumatic tire can be produced by heating this uncrosslinked tire under pressure in a vulcanizer.

The thickness of the inner liner layer measured at a tire maximum width position in a state of being filled with a defined inner pressure is preferably within a range from 0.05 to 0.5 mm When the thickness of the inner liner layer is 0.05 mm or more, a satisfactory effect of suppressing air pressure drop is exerted. In contrast, when the thickness of the inner liner layer is 0.5 mm or less, a satisfactory effect of improving fuel efficiency due to weight saving of the tire is exerted. The thickness of the inner liner layer is more preferably 0.15 mm or more, still more preferably 0.2 mm or more, more preferably 0.4 mm or less, and still more preferably 0.3 mm or less.

EXAMPLES

The present invention will be described specifically by way of examples, but the present invention is not limited only thereto.

Examples 1 to 4

Comparative Examples 1 to 10

According to each formulation shown in Table 1, a polymer mixture component, a filler and a clay mineral were charged in a twin screw extruder (screw diameter: φ50 mm, L/D: 30, cylinder temperature: 220° C.) and pelletized, and then a polymer composition was prepared by a T die extruder (screw diameter: φ80 mm, L/D: 50, die lip width: 500 mm, cylinder temperature: 220° C., film gauge: 0.3 mm).

Using the above polymer composition, a polymer sheet having a thickness of 0.3 mm was produced and was applied to an inner liner portion of each tire, followed by press molding at 170° C. for 20 minutes to produce a 195/65R15 tire as a pneumatic tire.

With respect to the resultant polymer composition, the following tests were performed.

<High-Temperature Tensile Test>

In accordance with JIS K 6251 "Vulcanized Rubber and Thermoplastic Rubber—How to Determine Adhesion", a No. 3 dumbbell test piece made of the polymer composition was allowed to stand at an atmospheric temperature of 100° C. for 2 minutes and a tensile test was carried out, and then a tensile strength at break and a tensile elongation at break of each test piece were measured.

<Flexural Fatigue Test>

In accordance with JIS K 6260 "De Mattia Flex Cracking Test of Vulcanized Rubber and Thermoplastic Rubber", a predetermined test piece with a groove in the center made of the polymer composition was produced. The crack length upon flexing at the repeated numbers of 700,000, 1,400,000, and 2,100,000 times under the conditions of an atmospheric temperature of 23° C., a strain of 30% and a period of 5 Hz was measured, and then the repeated number of flexural deformation required for the crack growth of 1 mm was calculated. The unit is times×$10^4$/mm The larger the numerical value is, the harder the crack grows and the more excellent the durability is.

<Air Permeability Test>

In accordance with ASTM D 1434 75M, the air permeation amount of a polymer composition was measured. The smaller the air permeation amount is, more excellent the air barrier properties are. Therefore, the air permeation amount is preferably about $10×10^{11}$ cm$^3$·cm/cm$^2$·s·cm·Hg or less, and more preferably about $5×10^{11}$ cm$^3$·cm/cm$^2$·s·cm·Hg or less.

With respect to a pneumatic tire, the following tests were carried out.

<Rolling Resistance Test>

Using a rolling resistance tester manufactured by KOBE STEEL., LTD., the obtained 195/65R15 steel radial PC tire was mounted on a JIS standard rim (15×6JJ), and rolling resistance was measured while driving the tire at room temperature (38° C.) under the conditions of a load of 3.4 kN, an air pressure of 230 kPa and a speed of 80 km/hour. Using the following calculation equation, the rolling resistance change rate (%) of each formulation was expressed by an index (the value of Comparative Example 1 was regarded as ±0). The smaller the rolling resistance change rate, the smaller the rolling resistance, and the more excellent the performance. Specifically, the rolling resistance change rate is preferably a minus value.

(Rolling resistance change rate)=(Rolling resistance of each formulation−Rolling resistance of Comparative Example 1)/(Rolling resistance of Comparative Example 1)×100

<Static Air Pressure Drop Test>

The 195/65R15 steel radial PC tire is mounted on a JIS standard rim (15×6JJ) and an initial air pressure of 300 Kpa is applied. After standing at room temperature for 90 days, a decrease rate of an air pressure is calculated.

<Evaluation Results>

The test results and overall judgment are shown in Table 1. Criteria of overall judgment are as shown in Table 2

TABLE 1

|   |   |   | Examples | | | | Comparative Examples | |
|---|---|---|---|---|---|---|---|---|
|   |   |   | 1 | 2 | 3 | 4 | 1 | 2 |
| Amount (parts by mass) | Polymer mixture component | SIBS[Note 1] | 90 | 90 | 90 | 70 | — | 90 |
|   |   | Polyamide-based polymer[Note 2] | 10 | 10 | 10 | 10 | — | 10 |
|   |   | Ethylene-vinyl alcohol copolymer[Note 3] | — | — | — | 20 | — | — |
|   |   | Chlorobutyl[Note 4] | — | — | — | — | 80 | — |

TABLE 1-continued

|  |  |  |  |  |  |  |  |  |
|---|---|---|---|---|---|---|---|---|
|  |  | NR[Note 5] | — | — | — | — | 20 | — |
|  |  | Filler[Note 6] | — | — | — | — | 60 | — |
|  | Clay mineral | Organic derivative of a clay mineral[Note 7] | 0.1 | 30 | 50 | 30 | — | — |
|  |  | Inorganic clay mineral[Note 8] | — | — | — | — | — | — |
| Evaluation | Laboratory test | Tensile strength at break (100° C., MPa) | 2.3 | 3.5 | 4.9 | 4.1 | 4.7 | 2.0 |
|  |  | Tensile elongation at break (100° C., %) | 653 | 627 | 558 | 530 | 650 | 677 |
|  |  | Flexural fatigue properties (times × 10$^4$/mm) | 4000 | 7000 | 5000 | 4000 | 9000 | 2000 |
|  |  | Air permeation amount (×10$^{11}$ cm$^3$ · cm/cm$^2$ · s · cm · Hg) | 4.3 | 3.8 | 4.4 | 4.4 | 12.2 | 4.5 |
|  | Tire test | Rolling resistance change rate | −4.2 | −4.3 | −4.6 | −3.1 | reference (0) | −2.7 |
|  |  | Static air pressure drop rate (%/month) | 1.9 | 1.6 | 1.4 | 2.1 | 4.0 | 2.1 |
|  |  | Overall judgment | B | A | A | B | C | D |

|  |  |  | Comparative Examples |  |  |  |  |  |  |  |
|---|---|---|---|---|---|---|---|---|---|---|
|  |  |  | 3 | 4 | 5 | 6 | 7 | 8 | 9 | 10 |
| Amount (parts by mass) | Polymer mixture component | SIBS[Note 1] | 50 | 100 | — | — | 90 | 90 | 90 | 90 |
|  |  | Polyamide-based polymer[Note 2] | 50 | — | 100 | — | 10 | 10 | 10 | 10 |
|  |  | Ethylene-vinyl alcohol copolymer[Note 3] | — | — | — | 100 | — | — | — | — |
|  |  | Chlorobutyl[Note 4] | — | — | — | — | — | — | — | — |
|  |  | NR[Note 5] | — | — | — | — | — | — | — | — |
|  |  | Filler[Note 6] | — | — | — | — | — | — | — | — |
|  | Clay mineral | Organic derivative of a clay mineral[Note 7] | 30 | 30 | 30 | 30 | 0.05 | 55 | — | — |
|  |  | Inorganic clay mineral[Note 8] | — | — | — | — | — | — | 0.1 | 50 |
| Evaluation | Laboratory test | Tensile strength at break (100° C., MPa) | 4.6 | 2.9 | 8.5 | 6.1 | 1.0 | 5.1 | 1.3 | 3.2 |
|  |  | Tensile elongation at break (100° C., %) | 495 | 636 | 355 | 381 | 689 | 253 | 327 | 256 |
|  |  | Flexural fatigue properties (times × 10$^4$/mm) | 800 | 1500 | 200 | 150 | 2000 | 1500 | 100 | 10 |
|  |  | Air permeation amount (×10$^{11}$ cm$^3$· cm/cm$^2$ · s · cm · Hg) | 8.1 | 3.5 | 18.5 | 10.0 | 4.5 | 3.6 | 4.5 | 6.3 |
|  | Tire test | Rolling resistance change rate | −3.2 | −2.2 | −1.1 | −1.9 | −2.8 | 1.5 | 1.4 | 2.0 |
|  |  | Static air pressure drop rate (%/month) | 2.3 | 1.3 | 7.6 | 5.3 | 2.5 | 1.6 | 2.7 | 2.0 |
|  |  | Overall judgment | D | D | D | D | D | D | D | D |

[Note 1]SIBS: "SIBSTAR 102T" (Shore A hardness of 25, styrene unit content of 25% by mass) manufactured by Kaneka Corporation
[Note 2]Polyamide-based polymer: "UBESTA XPA 9040 (Shore D hardness of 40)" manufactured by Ube Industries, Ltd.
[Note 3]Ethylene-vinyl alcohol copolymer: "EVAL E105" manufactured by KURARAY CO., LTD.
[Note 4]Chlorobutyl: "Exxon chlorobutyl 1068" manufactured by Exxon Mobil Corporation
[Note 5]NR (natural rubber): TSR20
[Note 6]Filler: "SEAST V" (N660, N$_2$SA of 27 m$^2$/g) manufactured by Tokai Carbon Co., Ltd.
[Note 7]Organic derivative of a clay mineral: "BENTONE34" (layered clay mineral: hectorite clay mineral, organic compound: dimethyldistearylammonium salt, cation exchange amount of organic compound: 100 meq/100 g) manufactured by Pheox Co.
[Note 8]Inorganic clay mineral: "Kunipia F", manufactured by KUNIMINE INDUSTRIES CO., LTD.

TABLE 2

| Overall judgment | Criteria | (a) Tensile strength at break (100° C., MPa) | (b) Tensile elongation at break (100° C., %) | (c) Flexural fatigue properties (times × 10$^4$/mm) | (d) Air permeation amount (×10$^{11}$ cm$^3$ · cm/cm$^2$ · s · cm · Hg) | (e) Rolling resistance change rate | (f) Static air pressure drop rate (%/month) |
|---|---|---|---|---|---|---|---|
| A | (a) to (f) satisfy all criteria described in right columns | 3.5 or more | 550 or more | 5,000 or more | 4.4 or less | −4.3 or less | 1.6 or less |
| B | (a) to (f) satisfy one or more criteria described in right columns | 2.3 to 3.4 | 450 to 549 | 3,000 to 4,999 | 4.5 to 10 | −4.2 to 0 | 1.7 to 2.1 |
| C | (a) to (f) satisfy one or more criteria described in right columns | 1.5 to 2.2 | 350 to 449 | 2,000 to 2,999 | 10.1 to 13 | 0.1 to 1.0 | 2.2 to 4.0 |
| D | (a) to (f) satisfy one or more criteria described in right columns | 1.4 or less | 349 or less | 1,999 or less | 13.1 or more | 1.1 or more | 4.1 or more |

The polymer compositions of Examples 1 to 3 are polymer compositions containing 90 parts by mass of a styrene-isobutylene-styrene triblock copolymer (SIBS), 10 parts by mass of a polyamide-based polymer that contains polyamide in the molecular chain and has a Shore D hardness of 70 or less, and 0.1, 30, and 50 parts by mass of an organic derivative of a clay mineral. The polymer compositions improved air permeation resistance while maintaining high-temperature tensile properties. Furthermore, rolling resistance and static air pressure drop rate of pneumatic tires obtained by applying the polymer composition to an inner liner deteriorated.

The polymer composition of Example 4 is a polymer composition containing 70 parts by mass of an SIBS, 10 parts by mass of a polyamide-based polymer, 20 parts by mass of an ethylene-vinyl alcohol copolymer and 30 parts by mass of an organic derivative of a clay mineral. The polymer composition improved air permeation resistance while maintaining high-temperature tensile properties. Furthermore, rolling resistance and static air pressure drop rate of a pneumatic tire obtained by applying the polymer composition to an inner liner deteriorated.

The polymer composition of Comparative Example 1 is a polymer composition that contains chlorobutyl and a natural rubber as polymer mixture components and is blended with carbon black as a filler. The polymer composition is inferior in air permeation resistance, and a pneumatic tire using the same is inferior in static air pressure drop rate.

The polymer composition of Comparative Example 2 is a polymer composition that contains 90 parts by mass of an SIBS and 10 parts by mass of a polyamide-based polymer, and does not contain an organic derivative of a clay mineral. The polymer composition is inferior in high-temperature tensile properties and flexural fatigue properties.

The polymer composition of Comparative Example 3 is a polymer composition containing 50 parts by mass of an SIBS, 50 parts by mass of a polyamide-based polymer and 30 parts by mass of an organic derivative of a clay mineral. The polymer composition has a small content of an SIBS and is inferior in flexural fatigue properties and air permeation resistance, and a pneumatic tire using the same is inferior in static air pressure drop rate.

The polymer composition of Comparative Example 4 is a polymer composition containing 100 parts by mass of an SIBS and 30 parts by mass of an organic derivative of a clay mineral, and does not contain a polyamide-based polymer. The polymer composition is inferior in flexural fatigue properties.

The polymer composition of Comparative Example 5 is a polymer composition containing 100 parts by mass of a polyamide-based polymer and 30 parts by mass of an organic derivative of a clay mineral, and does not contain an SIBS. The polymer composition is inferior in flexural fatigue properties and air permeation resistance, and a pneumatic tire using the same is inferior in static air pressure drop rate.

The polymer composition of Comparative Example 6 is a polymer composition containing 100 parts by mass of an ethylene-vinyl alcohol copolymer and 30 parts by mass of an organic derivative of a clay mineral, and does not contain an SIBS and a polyamide-based polymer. The polymer composition is inferior in flexural fatigue properties and air permeation resistance, and a pneumatic tire using the same is inferior in static air pressure drop rate.

The polymer composition of Comparative Example 7 is a polymer composition containing 90 parts by mass of an SIBS, 10 parts by mass of a polyamide-based polymer and 0.05 part by mass of an organic derivative of a clay mineral. The polymer composition is inferior in high-temperature tensile properties and flexural fatigue properties, and a pneumatic tire using the same is inferior in static air pressure drop rate.

The polymer composition of Comparative Example 8 is a polymer composition containing 90 parts by mass of an SIBS, 10 parts by mass of a polyamide-based polymer and 55 parts by mass of an organic derivative of a clay mineral. The polymer composition is inferior in high-temperature tensile properties and flexural fatigue properties, and a pneumatic tire using the same is inferior in a rolling resistance change rate.

The polymer composition of Comparative Example 9 is a polymer composition containing 90 parts by mass of an SIBS, 10 parts by mass of a polyamide-based polymer and 0.1 part by mass of an organic derivative of a clay mineral. The polymer composition is inferior in high-temperature tensile properties and flexural fatigue properties, and a pneumatic tire using the same is inferior in rolling resistance change rate and static air pressure drop rate.

The polymer composition of Comparative Example 10 is a polymer composition containing 90 parts by mass of an SIBS, 10 parts by mass of a polyamide-based polymer and 50 parts by mass of an inorganic clay mineral. The polymer composition is inferior in high-temperature tensile properties, flexural fatigue properties and air permeation resistance, and a pneumatic tire using the same is inferior in static air pressure drop rate.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A pneumatic tire comprising an inner liner made of a polymer composition comprising 0.1 to 50 parts by mass of an organic derivative of a clay mineral based on 100 parts by mass of a polymer mixture containing 99 to 60% by mass of a styrene-isobutylene-styrene triblock copolymer and 1 to 40% by mass of a polyamide-based polymer that contains polyamide in the molecular chain and has a Shore D hardness of 70 or less.

2. The pneumatic tire according to claim 1, wherein the polymer mixture contains 15 to 30% by mass of an ethylene-vinyl alcohol copolymer.

3. The pneumatic tire according to claim 1, the styrene-isobutylene-styrene triblock copolymer contains 10 to 30% by mass of a styrene unit.

4. The pneumatic tire according to claim 1, wherein the polyamide-based polymer is a block copolymer composed of a polyamide component and a polyether component.

* * * * *